No. 635,077. Patented Oct. 17, 1899.
C. A. PIERCE.
FASTENING DEVICE OR CLASP.
(Application filed Jan. 11, 1899.)
(No Model.)
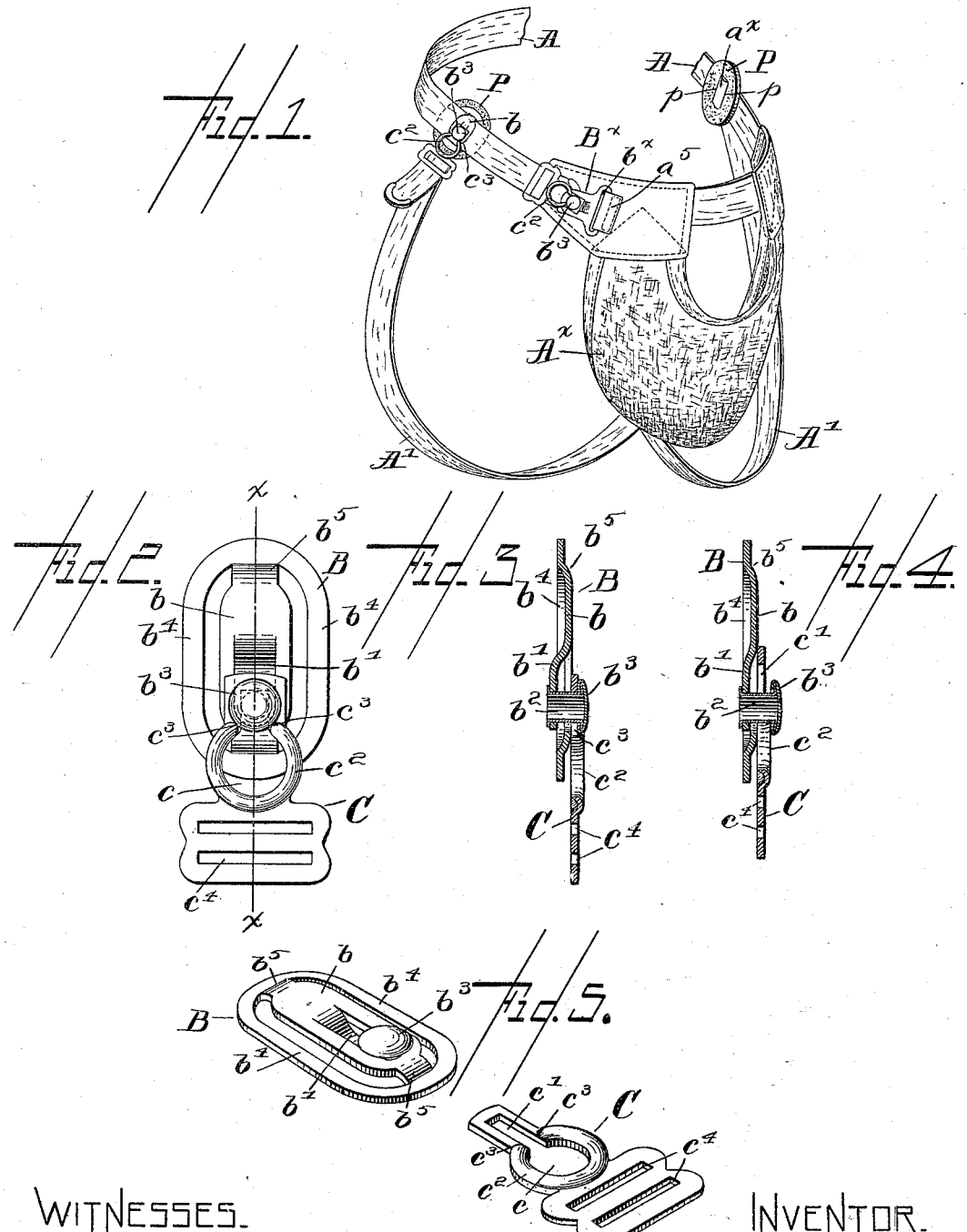
WITNESSES.
Charles F. Logan.
Thomas J. Drummond.
INVENTOR.
CLARENCE A. PIERCE.
BY Crosby & Gregory
ATT'YS.

UNITED STATES PATENT OFFICE.

CLARENCE A. PIERCE, OF WOBURN, MASSACHUSETTS, ASSIGNOR TO CHARLES P. JAYNES, OF BOSTON, MASSACHUSETTS.

FASTENING DEVICE OR CLASP.

SPECIFICATION forming part of Letters Patent No. 635,077, dated October 17, 1899.

Application filed January 11, 1899. Serial No. 701,783. (No model.)

*To all whom it may concern:*

Be it known that I, CLARENCE A. PIERCE, of Woburn, county of Middlesex, and State of Massachusetts, have invented an Improvement in Fastening Devices or Clasps, of which the following description, in connection with the accompanying drawings, is a specification, like letters on the drawings representing like parts.

This invention has for its object the production of an improved fastening device particularly adapted for use with a suspensory or similar bandage, whereby it may be worn with greater ease and comfort and be quickly and readily adjusted as may be desired.

Figure 1 is a perspective view, with the waistband partially broken out, of a bandage provided with a fastening device embodying one form of my invention. Fig. 2 is an enlarged top or plan view of the separable fastening device shown in Fig. 1. Figs. 3 and 4 are longitudinal sectional views thereof on the line $x$ $x$, Fig. 2, showing, respectively, the members of the fastening device as locked and partially unlocked; and Fig. 5 is a perspective view of the two members of the fastening device separated.

Referring to Fig. 1, the bandage comprises, essentially, a waistband or belt A, made of webbing or other suitable material, having an attached suspensory $A^\times$, of usual construction, and positioning or thigh bands A' A', fixedly attached at one end to the lower edge of the suspensory and at their other ends adjustably and detachably connected with the waistband A.

Referring to Figs. 2 to 5, inclusive, I have shown my preferred form of fastening device for adjustably and detachably connecting the thigh-bands with the waistband, said device consisting of two separable members B and C, preferably struck up or otherwise formed from sheet metal. The loop-like member C has a slot or opening therein enlarged at its upper or inner end, as at $c$, to conveniently receive the headed stud, to be described, on the coöperating member B, said slot being contracted at its outer end, as at $c'$, the member being thickened at $c^2$ around the enlarged end $c$ of the opening to form locking-shoulders $c^3$ at the entrance to the contracted end $c'$ of said opening. Beyond the inner end of the opening the member C is provided with transverse slots $c^4$ for attachment, the free end of the thigh-band A' being drawn through said slots, as shown clearly in Fig. 1. The body $b$ of the coöperating member B of the fastening device has a metallic resilient or spring tongue $b'$ struck up or formed upon it, said tongue having at its free end an attached upright holding-stud $b^2$, provided with an enlarged head $b^3$, the elasticity of the tongue normally acting to draw the head of the stud toward the adjacent face of the body $b$.

When the two members B and C are to be connected, the head $b^3$ of the prong is inserted in the enlarged end $c$ of the slot, and then the stud is drawn into the contracted portion of the slot toward the outer end thereof. As the stud enters such contracted portion the thickened portion $c^2$ of the member C passes between the body $b$ and the under side of the head $b^3$, lifting the latter (see Fig. 4) until it is past the shoulders $c^3$, as in Figs. 2 and 3, whereupon the spring-finger $b'$ immediately acts to return the head to normal position, the shoulders by engagement with the head normally resisting the return of the stud to the enlarged portion of the slot, thus locking the separable members B and C together. When they are so locked, the said members are pivotally connected, having free relative lateral movement about the stud $b^2$ as a common center.

The member B may be secured to its support in different ways, according to the use to which it may be put, and I have shown means whereby such member may be mounted to slide upon its support and be frictionally held in adjusted position thereupon. For this purpose the body $b$ is provided with side bars $b^4$, connected therewith at its ends, and to bring said side bars and the body in different parallel planes the latter is shown as arched or bent at its ends at $b^5$ where it joins the bars, the outer edges of the latter being rounded, as shown in Figs. 2 and 5, to avoid sharp corners.

Referring to Fig. 1, the waistband A is passed over the side bars $b^4$ and under the body $b$, so that the member B can be slid upon the band sidewise, the friction of the parts holding the member in position on the band until positively moved upon it.

In connection with the said device I use protective pads P, of felt or other suitable material, interposed between the body of the wearer and the member B of the fastening device, the pad having parallel slits $p$ therein, through which the bight $a^\times$ of the band A is passed. This serves to connect the pad or member B to be moved together, and the interposition of a portion of the pad between the bight $a^\times$ of the band and the under face of the body $b$ serves to increase the frictional holding power to retain the member B in adjusted position on the band A. It will thus be obvious that the free ends of the thigh-bands are detachably and adjustably connected with the waistband at any desired points, and I am enabled to entirely dispense with pins, buckles, and other usual forms of attachment, to the end of greatly increased comfort and convenience to the user.

The fixed member $B^\times$ of the fastening device to connect the two ends of the waistband is slightly modified as to the manner of its attachment to the said band, as shown in Fig. 1, said member $B^\times$ having a transverse slot $b^\times$ therein to receive an attaching-loop $a^5$, sewed to the band.

My invention is not restricted to the precise construction and arrangement herein shown and described, as the same may be modified in various particulars without departing from the spirit and scope of my invention.

Having fully described my invention, what I claim, and desire to secure by Letters Patent, is—

In a device of the class specified, a waistband, a thigh-band, a member uniting the waist and thigh bands and consisting of two detachably-united parts one of which has a spring-tongue provided with a headed stud, and the other of which has a slot to receive said stud, and the upper part being located outside of the waistband and having two openings to receive the waistband, and a felt disk located inside the belt opposite said upper part of the connecting member, and having two openings to receive said waistband.

In testimony whereof I have signed my name to this specification in the presence of two subscribing witnesses.

CLARENCE A. PIERCE.

Witnesses:
LAURA T. MANIX,
FREDERICK L. EMERY.